Patented Aug. 3, 1948

2,446,430

UNITED STATES PATENT OFFICE 2,446,430

CHLORINATION OF HYDROCARBONS

James A. Norton, Niagara Falls, N. Y., assignor to E. I. du Pont de Nemours & Company, Wilmington, Del., a corporation of Delaware No Drawing. Application November 11, 1943, Serial No. 509,920

5 Claims. (Cl. 204—163)

This invention relates to a new and improved method for chlorinating certain aromatic hydrocarbons in order to introduce chlorine into the aliphatic side chains thereof, the chlorination being carried out under such circumstances as to minimize the amount of undesired chlorinated products formed, as well as to prevent, to the greatest extent possible, decomposition and polymerization of the resulting compounds. More particularly, it relates to the chlorination of the xylenes, including ortho, meta, and para xylenes, to yield the corresponding xylyl and xylylene chlorides, this chlorination being carried out under such circumstances as to reduce the amount of undesired higher chlorinated products formed.

The aromatic hydrocarbon xylene exists in the ortho, meta, and para forms, and commercial or technical-grade xylene is ordinarily a mixture of all three isomers. My invention is particularly concerned with a process by which these aromatic hydrocarbons may be chlorinated in the side chains to yield the corresponding xylylene chlorides of the following structural formulae:

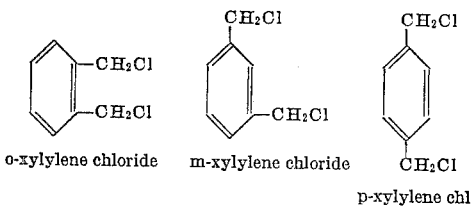

o-xylene chloride   m-xylylene chloride   p-xylylene chloride

These compounds belong to the rare and expensive class of chemical compounds known as alpha-omega dichlorides. That is, they are compounds in which the chlorine atoms are primary chlorine atoms separated by two or more carbon atoms. These compounds are valuable as intermediates in chemical syntheses, since they possess reactive side-chain chlorine atoms.

It is, accordingly, one of the objects of this invention to prepare xylylene chlorides, whether ortho, meta, or para xylylene chlorides, or mixtures thereof, under circumstances wherein the desired product is present in relatively high yields, there being obtained but relatively small amounts of undesired lower chlorinated and higher chlorinated reaction products. It is another object of this invention to render available to the chemical manufacturing industry a process which can be used to prepare, cheaply and in abundant amounts, chlorinated compounds of the hitherto rare and expensive class of alpha-omega dichlorides, this process permitting much higher yields of the desired products than previously possible with methods involving the reaction of the hydrocarbon and chlorine. Still another object of this invention is to minimize the decomposition and polymerization of the desired products, both during the chlorination step and during that part of the process wherein the desired dichlorides are purified and isolated in the substantially pure state. These and still further objects of my invention will be apparent from the ensuing disclosure of certain preferred embodiments thereof.

As now ordinarily practiced, xylylene chlorides are produced by chlorinating xylene in the presence of light and in the absence of metals such as iron or aluminum which would direct the entering chlorine atoms to the aromatic nucleus instead of the aliphatic side chain of the hydrocarbon. Light is preferably supplied by direct sunlight, although artificial light such as that from an incandescent bulb may be utilized. The chlorination is carried out generally at the temperature of reflux in order that it may proceed with sufficient rapidity. Although eliminating the presence of metals such as iron or aluminum, and utilizing equipment constructed of glass or ceramic ware will prevent, or at least greatly reduce, the formation of the undesired nuclear chlorinated compounds, I have found that this process, as ordinarily practiced, is not satisfactory. The formation of the desired xylylene chlorides is complicated by the simultaneous formation of large amounts of resinous or tarry products, as well as by the formation of chlorinated xylenes other than the desired xylylene chlorides. As a result the yields of the desired alpha-omega dichlorides have been relatively low, thus increasing their cost and rendering the process generally unacceptable as a commercially utilizable procedure.

It has now been found that the formation of tarry and gummy by-products during the chlorination of xylene to xylylene chlorides in the presence of light and in the absence of the metals iron and aluminum is almost completely eliminated when the reaction is carried out under conditions wherein the xylene is suspended in a suitable solvent, not readily attacked by chlorine, such as chloroform or carbon tetrachloride. The use of a diluent, such as a solvent not readily attacked by chlorine, not only substantially eliminates the formation of gums, tars, and resins, but also greatly reduces the percentage of chlorinated xylenes other than the desired xylylene chlorides in the reaction mixture.

I have also found that this process of chlorinating xylene in the side chains can also be greatly improved by carrying out the reaction in the presence of a small amount of oxygen. The oxygen, which may be introduced, for example, in the form of air, is preferably added to the chlorine stream which is supplied to the reaction mixture. Ordinarily I have found that 1% of oxygen or 5% of air, when the oxygen is introduced in the form of air, will be sufficient to obtain the desired results, these percentages being based on the amount of chlorine used up in the reaction. By having oxygen or air present during the reaction I have found that the tendency toward over-chlorination of the reaction product is reduced, thus lessening the amount of undesired reaction products of higher chlorine content secured. The presence of the air or oxygen serves to render the desired xylylene chloride product less susceptible to further attack by chlorine to form such products as the trichloro and tetrachloro xylenes. These products, which it is one aim of my improved process to reduce in amount to as great an extent as possible, may be represented by the following structural formulae, the compounds derived from p-xylene being taken as illustrative:

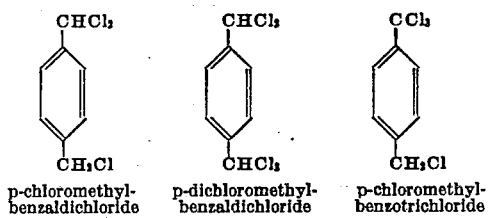

p-chloromethyl-benzaldichloride   p-dichloromethyl-benzaldichloride   p-chloromethyl-benzotrichloride Similar formulae may be written for the corresponding compounds derived from ortho- and meta- xylenes. Generally it is unnecessary to introduce the oxygen or air into the reaction mixture before about half of the theoretical amount of chlorine required for the complete reaction has been used up, as the primary function of the oxygen or air is to prevent or reduce the overchlorination of the desired product, xylylene chloride, to undesired higher chlorinated derivatives.

In order that the chlorine introduced may be prevented from attacking the nuclear hydrogen atoms of the aromatic ring instead of the hydrogen of the side chains of the xylene being chlorinated, it is essential that the metals iron and aluminum both be absent. This means that the reaction vessel and auxiliary equipment cannot be formed of these metals, but must be constructed of some other material such as glass or ceramic ware. While certain other substances such as stannic chloride, if present, are known to favor the substitution of chlorine in the nucleus rather than in the side chains, ordinarily this constitutes no problem, as neither tin nor stannic chloride is present, either as impurities in the reactants or as part of the apparatus. However, iron and aluminum are both likely to be present as impurities in the compounds being reacted, two of their many possible sources being as drum scale in the container for the xylene stock, or as dust in the atmosphere. I have found that the presence of these elements in the chlorinated product tends to favor self-condensation of the xylylene chlorides, largely by means of the type of reaction known as the Friedel-Crafts reaction, this condensation resulting in the production of high molecular-weight compounds containing variable amounts of chlorine and the evolution of hydrogen chloride during the process.

I have therefore found it advantageous to have present in the reaction mixture during the chlorination a small amount of phosphorus pentoxide. The phosphorus pentoxide serves to bind the iron and aluminum impurities in the form of the innocuous compounds, ferric or aluminum phosphates, these substances having no tendency to promote the undesired condensation reactions described. Since small quantities of water are usually present in the reagents, the active agent may actually constitute one or more of the various hydrated forms of phosphorus pentoxide, but as I do not know exactly how the phosphorus pentoxide functions in preventing these undesired reactions, I do not wish to be held to any particular method or theory of operation.

It may be remarked that the three xylenes differ in their sensitivity to iron, meta-xylene being most sensitive. It is also generally desirable that phosphorus pentoxide be present during the purification and recovery steps which succeed chlorination, as the danger of loss of valuable product by self-condensation reactions also exists during these stages of the process. The amount of phosphorus pentoxide needed during the chlorination, or during the purification and recovery steps, is not very large, and I have found that amounts as low as 0.05% by weight, based upon the weight of xylene reacted, are sufficient to prevent the occurrence of the undesired side reactions.

As examples of my new and improved process for the preparation of xylylene chlorides, the following may be given:

*Example 1*

In this process the substantially pure compound p-xylene was separated from a commercial mixture of the xylenes and subjected to chlorination to yield the desired p-xylylene chloride.

106 parts of p-xylene were placed in a glass reaction vessel and 769 parts of carbon tetrachloride diluent added thereto. The reaction vessel was provided with a gas-tight stirrer, a thermometer well, an inlet tube for chlorine, a reflux condenser, means for heating and cooling the contents of the vessel, and with means for illuminating the reaction mixture. The illumination was supplied both by direct sunlight and by means of incandescent lamps, either mode of illumination being satisfactory for providing the actinic rays necessary to direct the entering chlorine to the aliphatic side chains of the xylene. There was also added to the suspension of p-xylene in carbon tetrachloride, phosphorus pentoxide in the amount of 0.01 to 0.05 part, this compound being added while the reaction mixture was being thoroughly stirred. All parts specified are by weight.

A suitable scrubbing system for collecting or absorbing the evolved hydrogen chloride and unreacted chlorine was then attached to the reflux condenser. The stirrer was started and the reaction mixture heated until reflux temperature was attained. Illumination of the reaction mixture was then begun and chlorine passed in slowly until the reaction, as determined by the evolution of hydrogen chloride, had commenced. The rate of chlorine introduction was then increased to 0.3 part of chlorine per minute and continued at that rate, the reaction mixture being subjected to the action of actinic radiation, until 71 parts of chlorine had been introduced. At this point, 3% of air, based upon the amount of chlorine supplied, was bled into the chlorine feed line and the rate of chlorine addition reduced to 0.15 part per minute. The reaction was continued until 120 parts of chlorine, over and above that which passed through the system unreacted, had been introduced.

The greater part of the carbon tetrachloride was then removed by distillation from the reaction vessel at a pressure somewhat less than atmospheric. When about 80% of the carbon tetrachloride diluent had been thus removed, the residue was transferred to a suitable, non-ferrous distilling pot equipped with a suitable fractionation column and 0.05 part of phosphorus pentoxide added. The residue was then fractionated at reduced pressure and gave the following products:

| | Parts |
|---|---|
| Unreacted p-xylene | 9.8 |
| p-Xylyl chloride | 64.5 |
| p-Xylylidene chloride | 8.1 |
| p-Xylylene chloride | 65.3 |
| Higher boiling materials (containing both p-xylylene chloride and p-chloromethylbenzaldichloride) | 8.9 |
| Residue | 3.6 |

The p-xylylene chloride, present in very high yield, was then purified by crystallization. Although any suitable solvent could be utilized, the p-xylylene chloride was crystallized from a solution of the compound in technical xylene. In this way about 85% of the crude p-xylylene chloride was recovered as a pure compound, having a melting point 99–101° C. The mother liquor, containing mainly p-xylylene chloride, together with smaller amounts of p-xylylidene chloride and p-chloromethylbenzaldichloride, was further subjected to redistillation to separate further amounts of the desired p-xylylene chloride. During the step of dissolving the crude p-xylylene chloride in technical xylene in order that it may be recrystallized and thus purified, a small amount of phosphorus pentoxide was also introduced into the solution in order to prevent decomposition of the desired product, which decomposition might be catalyzed by impurities present in the xylene, such as iron, if the phosphorus pentoxide were not present.

p-Xylylene chloride and p-chloromethylbenzaldichloride form a eutectic mixture having a melting point between 55° C. and 60° C., which mixture comprises about 80% of p-xylylene chloride and 20% of p-chloromethylbenzaldichloride. The melting point of pure p-chloromethylbenzaldichloride is 98–99° C.

The lower chlorinated products, such as p-xylyl chloride, could be recycled during the chlorination of further amounts of p-xylene, and this was done, thereby increasing still further the yield of the desired product p-xylylene chloride.

*Example 2*

The deleterious effect of iron was illustrated by recrystallizing the p-xylylene chloride of Example 1 from hot technical xylene, without having present therein phosphorus pentoxide. Substantial amounts of hydrogen chloride were evolved during the crystallization process, and only about half of the amount of introduced p-xylylene chloride was recovered as satisfactory product. The other half of the charge was recovered as a high boiling fluorescent oil by distilling off the technical xylene. Upon examination this oil showed the presence of iron. As will be apparent from Example 1, substantially all of the p-xylylene chloride can be crystallized out as a satisfactory product from a solution thereof in hot technical xylene by having present phosphorus pentoxide in amounts as low as 0.01% by weight, based upon the weight of p-xylylene chloride.

*Example 3*

In this example the commercial xylene mixture, containing ortho, meta, and para xylenes, was utilized without separation or purification.

765 parts of the commercial xylene mixture, together with 1230 parts of carbon tetrachloride and 0.05 part of phosphorus pentoxide were introduced into the reaction apparatus described in Example 1. All parts are by weight.

The vessel was heated to reflux temperature and illuminated by means of an electric light, as described in Example 1. Chlorine in the amount of 177 parts was passed into the reaction vessel at the rate of 0.3 part per minute. Air in the amount of 5%, based upon the amount of chlorine present, was then bled into the stream of chlorine gas and the chlorine addition rate lowered to 0.15 part per minute. The chlorine addition continued, air being bled into the stream of gas, until a total of 283 parts of chlorine had been used up in the reaction, this amount being the chlorine actually reacted, not including that portion thereof which passed unchanged through the system. At this point chlorine addition was stopped, and the mixture distilled, utilizing the procedure described in Example 1.

The reaction product included the following constituents:

| | Parts |
|---|---|
| A mixture of xylene and xylyl chlorides | 12 |
| Mixed isomeric xylyl chlorides | 130 |
| A mixture of xylyl chloride and xylylidene chloride | 10 |
| Mixed xylylidene chlorides | 10 |
| A mixture of xylylidene chlorides and xylylene chlorides | 10 |
| Mixed isomeric xylylene chlorides | 170 |
| Mixed isomeric chloromethylbenzaldichlorides | 20 |

In this case the xylylene chlorides product is a liquid, from which the para-isomer may crystallize, and it may be further purified by fractional distillation. It should be noted that the chlorination product, high in the desired xylylene chlorides product, was substantially free from 4-chloro-m-xylene and derivatives thereof, which are produced in varying amounts when phosphorus pentoxide is not present in the reaction mixture.

*Example 4*

This example illustrates the advantages of carrying out the chlorination in an inert solvent or diluent which will not readily react with chlorine, such as carbon tetrachloride or chloroform.

212 parts of p-xylene were introduced into the apparatus of Example 1. Phosphorus pentoxide in the amount of 0.01 part was then added, and the mixture heated to reflux temperature, approximately 90° C. The reaction mixture was illuminated by means of an incandescent bulb and chlorine passed in at the rate of 0.5 to 0.6 part per minute. All parts given are by weight.

The reaction mixture became very black, and the process was halted when 156 parts of chlorine had been introduced. Upon distillation the following products were obtained:

| | Parts |
|---|---|
| p-Xylyl chloride | 126 |
| p-Xylylene chloride | 42 |
| p-Xylene | 45 |
| Tarry residue | 42 |

The yield of p-xylylene chloride was only about 12% of theory, thus illustrating the advantages of carrying out the reaction in a diluent or solvent.

*Example 5*

This example shows recycling the lower chlorinated materials, such as p-xylyl chloride, which may be carried out without addition of other materials but preferably admixed with fresh p-xylene, in order to secure further amounts of the desired xylylene chloride.

140.5 parts of the p-xylyl chloride obtained by following the procedure described in Example 1 were charged into the same reaction vessel, together with 769 parts of recovered carbon tetrachloride and from 0.01 to 0.05 part of phosphorus pentoxide. The mixture was heated to reflux temperature, subjected to actinic radiation from an incandescent bulb, and 51.2 parts of chlorine were introduced. In the initial stages of the reaction no air was admixed with the chlorine, but when the reaction was well under way 5% of air, based upon the weight of chlorine, was bled into the chlorine stream.

7.8 parts of unreacted chlorine were recovered in the scrubbing system. The rate of chlorination was 0.15 part of chlorine introduced per minute.

The reaction product was then distilled in the presence of phosphorus pentoxide, and the following compounds were obtained in the amounts noted:

| | Parts |
|---|---|
| p-Xylyl chloride | 68.2 |
| p-Xylylidene chloride | 12.5 |
| p-Xylylene chloride | 66.2 |
| p-Chloromethylbenzaldichloride | 7.4 |
| Residue | 5.2 |

The high yield of the desired product, p-xylylene chloride, is evident, thus proving the value of recycling lower chlorinated products.

For purposes of information the boiling points at 20 millimeters of mercury pressure of the various chlorinated compounds referred to are given below:

| | °C. |
|---|---|
| Xylyl chloride | 95 |
| Xylylidene chloride | 112 |
| Xylylene chloride | 139–142 |
| Chloromethylbenzaldichloride | 155–158 |

These boiling points are practically identical, regardless of whether the particular chlorinated product is derived from ortho, meta, or para xylene. In the para series the polychlorinated products are solids, p-xylylidene chloride melting at about 50° C., when pure.

In determining the constituents in the reaction mixtures and establishing that the compounds referred to were actually present therein, the constitution of xylylidene chloride was establed by hydrolysis with water under pressure, the product of the hydrolysis giving a positive test for aldehydes. Analysis for chlorine showed the presence of two halogen atoms in the molecule, both of which could be removed by treatment with sodium methylate solution. This showed that the chlorine was attached to the side chains, as nuclear chlorine atoms cannot be removed with sodium methylate.

That the compound referred to as chloromethylbenzaldichloride was actually that compound was also shown by hydrolysis with water under pressure, the product of the hydrolysis giving a positive test for aldehydes. Analysis for chlorine showed the presence of three chlorine atoms in the molecule, all of which chlorine was capable of removal by treatment with sodium methylate solution.

In the appended claims the term diluent is to be construed as meaning a diluting or suspending medium for the xylene starting material, whether the diluent is a solvent for the xylene or chloroxylenes or not. By actinic radiation is meant light of the necessary wave length effective as a catalyst in directing the entering chlorine atoms to the aliphatic side chains of the xylene, whether supplied by direct sunlight or artificial illumination. By substantial freedom of the reaction mixture from the adverse catalysts iron and aluminum is also meant, of course, the substantial absence of compounds of these metals.

It should be understood that various changes may be made in my improved procedure, certain preferred embodiments of which are herein described, without departing from the spirit or scope of my invention. Accordingly, it is intended that these modifications, to the extent that they are within the scope of the appended claims, shall be construed as within the purview of my invention.

I claim:

1. The process of preparing xylylene chlorides photochemically which comprises passing chlorine into xylene diluted with a diluent not readily attacked by chlorine, said reaction mixture being heated to reflux temperature and irradiated with a light source, adding phosphorus pentoxide to the reaction mixture in sufficient amount to convert any iron, aluminum, and compounds thereof present as impurities in the reaction mixture to iron and aluminum phosphates, whereby to reduce condensation of the desired xylylene chlorides to undesired high molecular weight compounds.

2. The process of claim 1 in which the diluent is a compound selected from the group consisting of chloroform and carbon tetrachloride.

3. The process of claim 1 in which the chlorine contains about 1% by weight thereof of oxygen.

4. The process of preparing xylylene chlorides photochemically which comprises passing chlorine, containing about 1% by weight of oxygen, into xylene diluted with a diluent selected from the group consisting of chloroform and carbon tetrachloride, said reaction mixture being heated to reflux temperature and irradiated with a light source, adding phosphorus pentoxide to the reaction mixture in sufficient amount to convert any iron, aluminum, and compounds thereof present as impurities in the reaction mixture to iron and aluminum phosphates, whereby to reduce condensation of the desired xylylene chlorides to undesired high molecular weight compounds.

5. The process of preparing xylylene chlorides photochemically which comprises passing chlorine into xylene diluted with a diluent not readily attacked by chlorine, said reaction mixture being heated to reflux temperature and irradiated with a light source, adding phosphorus pentoxide to the reaction mixture in sufficient amount to convert any iron, aluminum, and compounds thereof present as impurities in the reaction mixture to iron and aluminum phosphates, whereby to reduce condensation of the desired xylylene chlorides to undesired high molecular weight compounds, and recovering said xylylene chlorides by distilling them off from the other constituents of the reaction mixture, there being present during said distillation a sufficient amount of phosphorus pentoxide to convert any iron, aluminum, and compounds thereof present as impurities in the reaction mixture being distilled to iron and aluminum phosphates.

JAMES A. NORTON.

REFERENCES CITED

The following references are of record in the file of this patent:

UNITED STATES PATENTS

| Number | Name | Date |
|---|---|---|
| 1,146,142 | Ellis | July 13, 1915 |
| 1,191,916 | Brooks et al. | July 18, 1916 |
| 1,246,739 | Gibbs et al. | Nov. 13, 1917 |
| 1,420,346 | Snelling | June 30, 1922 |
| 1,954,438 | Britton et al. | Apr. 10, 1934 |
| 2,046,411 | Ramage | July 7, 1936 |
| 2,132,361 | Osswald | Oct. 4, 1938 |

FOREIGN PATENTS

| Number | Country | Date |
|---|---|---|
| 259,329 | Great Britain | Oct. 14, 1926 |

OTHER REFERENCES

"Journal of the American Chemical Society," vol. 51 (1929), pages 3082 through 3089.

"Chemical Action of Ultraviolet Rays," by Ellis et al., published in 1941 by Reinhold Publishing Corp., pages 532, 545, 546.

"Artificial Sunlight," by Luckiesch, published in 1930, page 116.

"Chemical Abstracts," vol. 29 (1935), pages 6214, 6215.